United States Patent [19]

Nishi

[11] Patent Number: 4,990,791
[45] Date of Patent: Feb. 5, 1991

[54] MULTI-DIMENSIONAL LASER DOPPLER VELOCIMETER

[75] Inventor: Hisami Nishi, Nishinomiya, Japan
[73] Assignee: Nippon Sheet Glass Co., Ltd., Osaka, Japan
[21] Appl. No.: 435,086
[22] Filed: Nov. 13, 1989

[30] Foreign Application Priority Data

Nov. 14, 1988 [JP] Japan ................................. 63-287079

[51] Int. Cl.$^5$ ................................................ G01P 3/36
[52] U.S. Cl. ...................................... 250/561; 356/28.5
[58] Field of Search ................. 250/561; 356/28, 28.5; 350/358; 372/13, 29, 32

[56] References Cited

U.S. PATENT DOCUMENTS

| | | | |
|---|---|---|---|
| 3,897,152 | 7/1975 | Farmer et al. | 356/349 |
| 3,930,733 | 6/1976 | Holly | 356/152 |
| 4,397,550 | 8/1983 | Matsuda et al. | 356/28.5 |
| 4,466,738 | 8/1984 | Huang et al. | 356/28.5 |
| 4,470,696 | 9/1984 | Ballard | 356/28.5 |
| 4,669,876 | 6/1987 | Dopheide | 356/28.5 |

*Primary Examiner*—David C. Nelms
*Assistant Examiner*—George C. Beck
*Attorney, Agent, or Firm*—Woodcock Washburn Kurtz Mackiewicz & Norris

[57] ABSTRACT

A reference beam type optical laser Doppler velocimeter for emitting two or more probe beams to an object to be measured at a predetermined angle to multi-dimensionally measure a velocity and/or a displacement vector of the object due to Doppler shifts of beams reflected by the object. This velocimeter includes a frequency shifting means for dividing a laser beam from a single light source into two or more beams, and shifting optical frequencies of the beams each by a predetermined shift amount, a photodetecting means for receiving the reflected and reference beams to obtain a detection current, and a bandpass filter for causing the detection current to pass therethrough to obtain a required signal.

10 Claims, 6 Drawing Sheets

MULTI-DIMENSIONAL LASER DOPPLER VELOCIMETER

BACKGROUND OF THE INVENTION

1. Field of the Invention

The present invention relates to a laser Doppler velocimeter for emitting a laser beam on an object to be measured to measure a velocity and/or a displacement of the object due to shift of a frequency of the beam, i.e., Doppler shift and, more particularly, to a measuring apparatus for causing one measuring unit to simultaneously measure a two- or three-dimensional velocity vector.

2. Description of the Prior Art

Conventionally, when a two- or three-dimensional velocity vector is measured, two or three one-dimensional velocimeters are combined, and outputs from the velocimeters are calculated to obtain the velocity vector. In this case, the size and cost of each apparatus are undesirably increased in proportion to the number of dimensions, and high-precision setting of a measuring probe must be performed upon every measuring operations. For example, a multi-dimensional velocimeter using an optical fiber and a plurality of one-dimensional velocimeters is disclosed in Japanese Patent Provisional Publication No. 93258/1982. In such multi-dimensional measurement, however, the following problems are posed in practice.

In order to increase a resolution of a portion to be measured, beams from the probes in the velocimeters are focused to form a spot. Since a surface which scatters beams is a target as an object to be measured in many cases, scattered beams from a given measuring probe are focused into stray beams at another probe, thus generating crosstalk between the probes. Since this crosstalk cannot be separated from an original signal, a velocity cannot be measured in practice. This phenomenon will be described hereinafter with reference to FIG. 1.

FIG. 1 shows an arrangement upon measurement of a two-dimensional velocity. Referring to FIG. 1, a scattered particle 5 which is an object to be measured has a velocity vector $\vec{V}$. The velocity vector $\vec{V}$ is divided into an X-direction velocity vector $\vec{V}_x$ and a y-direction velocity vector $\vec{V}_y$. When laser beams having angular frequencies $\omega_1$ and $\omega_2$ are emitted from two measuring probes 1 and 2 which form an angle $+\alpha$ with respect to the vector $\vec{V}_y$, respectively, Doppler angular frequency shift components $\Delta\omega_x$ and $\Delta\omega_y$ are obtained as follows:

$$\Delta\omega_x = 2 \cdot K \cdot V_x \sin\alpha \quad (1)$$

$$\Delta\omega_y = 2 \cdot K \cdot V_y \cos\alpha \quad (2)$$

where K is the absolute value of a wave vector of each laser beam, and $V_x$ and $V_y$ are the absolute values of the velocity vectors respectively. A Doppler shift component $\Delta\omega_{151}$ of a signal beam which passes through a path of 1→5→1 and a Doppler shift component $\Delta\omega_{251}$ of a crosstalk beam which passes through a path of 2→5→1 are defined as follows:

$$\Delta\omega_{151} = \Delta\omega_x - \Delta\omega_y \quad (3)$$

$$\Delta\omega_{251} = (\Delta_2 - \Delta_1) - \Delta\omega_y \quad (4)$$

When independent laser beams are used as a light source for two axes, a difference between optical frequencies $\omega_2 - \omega_1$ of the two laser beams is added to a crosstalk component. In general, since the difference between optical frequencies $\omega_2 - \omega_1$ of two individual laser beams randomly and largely changes with an elapse of time, the angular frequency $\Delta\omega_{251}$ of the crosstalk component irregularly changes. Even if $\omega_2 = \omega_1$ can be realized, a relationship between the magnitudes of the two Doppler shift components $\Delta\omega_{151}$ and $\Delta\omega_{251}$ is changed in accordance with the directions of the velocity vectors, and only the original signal component $\Delta\omega_{151}$ cannot be separated. For this reason, in practice, it is impossible to combine a plurality of one-dimensional laser velocimeters, each having a laser such as an He-Ne laser which can select only one frequency as a light source, and to perform multi-dimensional measurement.

In order to prevent this, two types of lasers having apparently different frequencies have been used. In this method, however, a very large-sized and high-cost laser such as an Ar-ion laser must be used, and a drawback that cost is increased in proportion to the number of axes cannot be eliminated.

OBJECT AND SUMMARY OF THE INVENTION

It is an object of the present invention to provide a small-sized reference beam type laser Doppler velocimeter having a single light source which can perform multi-dimensional velocity measurement, and can eliminate a drawback that the measurement by a conventional multi-dimensional velocimeter constituted by combining a plurality of one-dimensional velocimeters cannot be performed when a crosstalk beam occurs.

In order to achieve the above object, according to the present invention, there is provided a laser Doppler velocimeter comprising a frequency shifting means for dividing a laser beam from a single light source into two or more beams, and shifting optical frequencies of the beams each by a predetermined shift amount, whereby the optical frequencies of the beams are set to be different from each other to use the beams as a probe beam respectively, and to use each one of the beams as a reference beam having an optical frequency different from that of the probe beam which is used together with the reference beam, and a photodetecting means for receiving beams reflected by an object to be measured and the reference beam to obtain a detection current, and a bandpass filter for causing the detection current to pass therethrough to obtain a required signal.

Since a single light source and a plurality of beams obtained by shifting the optical frequency thereof at equal interval are used, and the beams serve as a probe beam and a reference beam each other, multi-dimensional velocity measurement can be performed by one apparatus. Crosstalk between probes can be eliminated by frequency separation.

DETAILED DESCRIPTION OF THE PREFERRED EMBODIMENTS

Preferred embodiments of the present invention will be described in detail with reference to the accompanying drawings.

Figure 1:
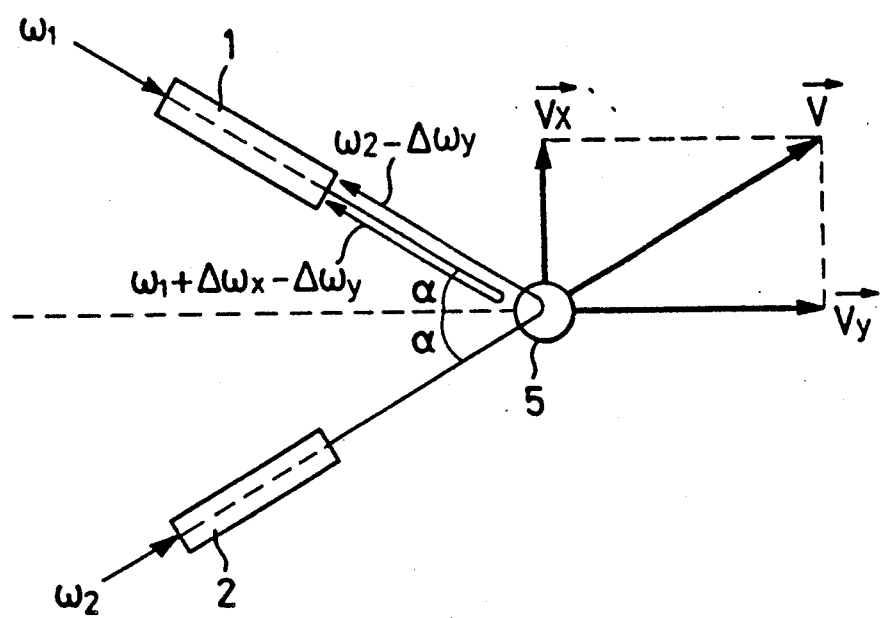
FIG. 1 is a view for explaining signal and crosstalk beams upon two-dimensional velocity measurement using a conventional measuring apparatus.
Figure 2:
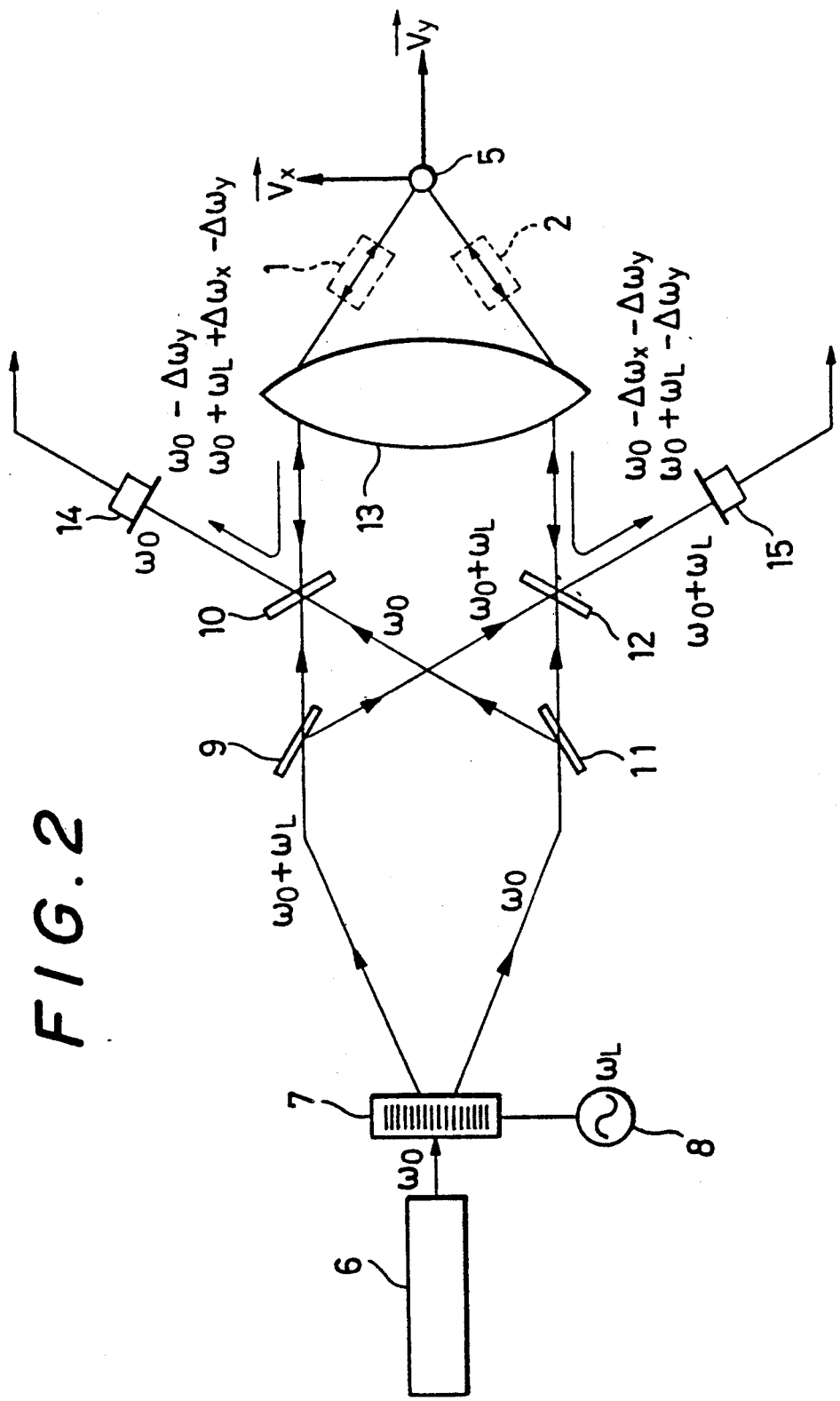
FIG. 2 is a view showing an arrangement of an optical system in a two-dimensional velocimeter according to the present invention.

FIG. 2 shows a arrangement of a two-dimensional velocimeter. This two-dimensional velocimeter includes a laser light source 6, an ultrasonic light deflector 7 serving as a frequency shifter, a driver 8 for the ultrasonic light deflector 7, half mirrors 9, 10, 11 and 12, a lens 13, photodetectors 14 and 15 each using, e.g., a PIN photodiode or an APD, and measuring probes 1 and 2. A beam oscillated by the laser light source 6 at an angular frequency $\omega_0$ is divided into two diffraction beams, i.e., beams of 0th and 1st order. The angular frequency of the 0th-order diffraction beam (non-diffraction beam) is represented by $\omega_0$. The 1st-order diffraction beam is frequency-shifted by a drive angular frequency $\omega_L$ of the driver 8 to obtain an angular frequency $\omega_0 + \omega_L$. In addition, $\omega_L >> \Delta\omega_x$ and $\omega_L >> \Delta\omega_y$ are predetermined.

A path of a light beam to be incident on the photodetector 14 will be described hereinafter.

A beam emitted from the probe 1 having an angular frequency $\omega_0 + \omega_L$ is subjected to Doppler shift through a path of 1→5→1 to be a signal beam having an angular frequency of $\omega_0 + \omega_L + \Delta\omega_x - \Delta\omega_y$. This signal beam is incident on the photodetector 14. At the same time, a crosstalk beam having an angular frequency of $\omega_0 - \Delta\omega_y$, which has passed through a path of 2→5→1, is also incident on the photodetector 14. In addition, a reference beam having an angular frequency $\omega_0$ splitted by the half mirror 11 is incident on the photodetector 14 by the half mirror 10. At this time, an intensity of the reference beam is set to be sufficiently larger than that of the signal beam.

As a result, a signal component having an angular frequency $\omega_L + \Delta\omega_x - \Delta\omega_y$ which have passed through the path of 1→5→1 and a crosstalk component $\Delta\omega_y$ appear as a detection current for the photodetector 14. When this detection current is passed through the bandpass filter having $\Delta\omega_L$ substantially as its center frequency, the crosstalk component is eliminated from the detection current because of $\omega_L >> \Delta\omega_l$ and $\Delta_L >> \Delta\omega_y$. An angular frequency which is a difference between the components $\Delta\omega_{151}$ and $\Delta\omega_{251}$ is also detected by the photodetector. However, since a signal intensity of both components is sufficiently smaller than that of the reference beam, these components are suppressed. Similarly, in the photodetector 15, a signal component $\Delta\omega_L + \Delta\omega_x + \Delta\omega_y$ which have passed through the path of 2→5→2 and a crosstalk component $\Delta\omega_y$ appear, and the crosstalk component is eliminated by the bandpass filter.

Figure 3:
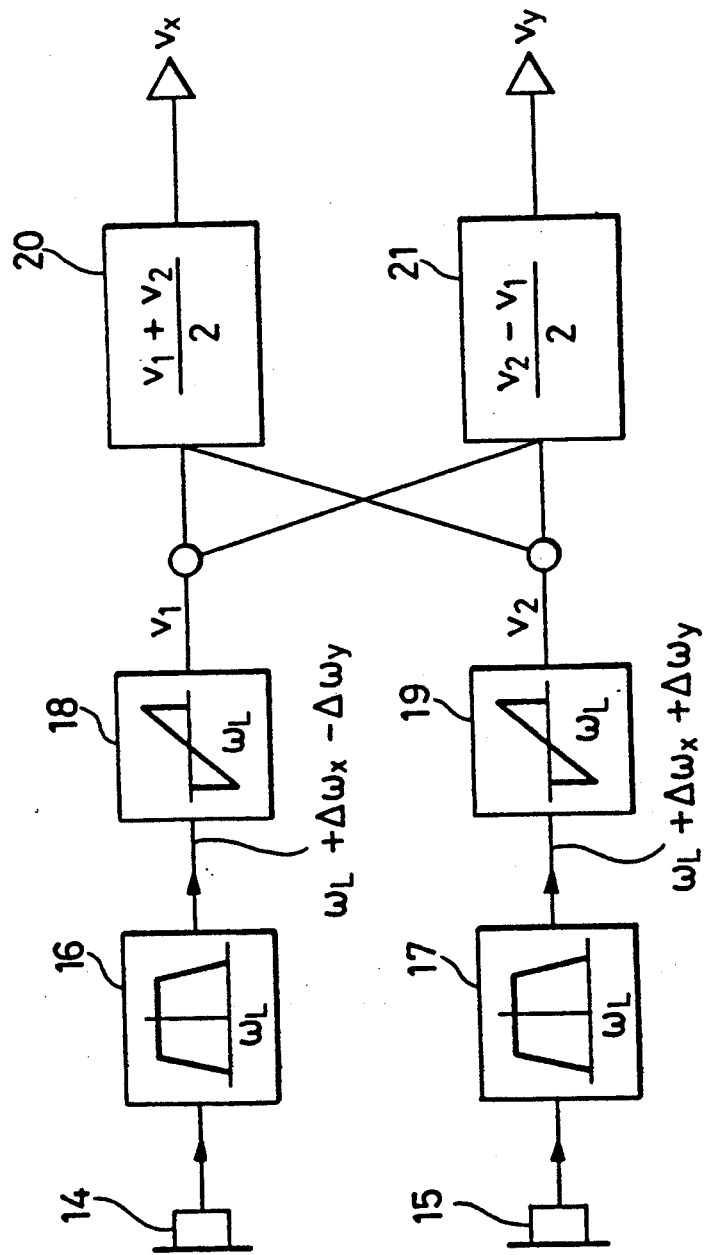
FIG. 3 is a view showing a signal processing system in the two-dimensional velocimeter shown in FIG. 2.

A signal processing system arranged to obtain a velocity vector is shown in FIG. 3.

The detection currents respectively obtained from the two photodetectors 14 and 15 pass through band-pass filters 16 and 17 each having a center frequency $\omega_L$, and the crosstalk components of these currents are eliminated. Thereafter, these currents respectively pass through frequency discriminators 18 and 19 for converting a frequency shift into a voltage. Since output signals $v_1$ and $v_2$ from the frequency discriminators 18 and 19 are respectively proportional to $V_x - V_y$ and $V_x + V_y$, a sum and a difference of the output signals $v_1$ and $v_2$ are obtained by an adder 20 and a subtracter 21, respectively. Therefore, velocity components $V_x$ and $V_y$ in both the x and y directions can be obtained as voltages $v_x$ and $v_y$ including their directions.

Figure 4:
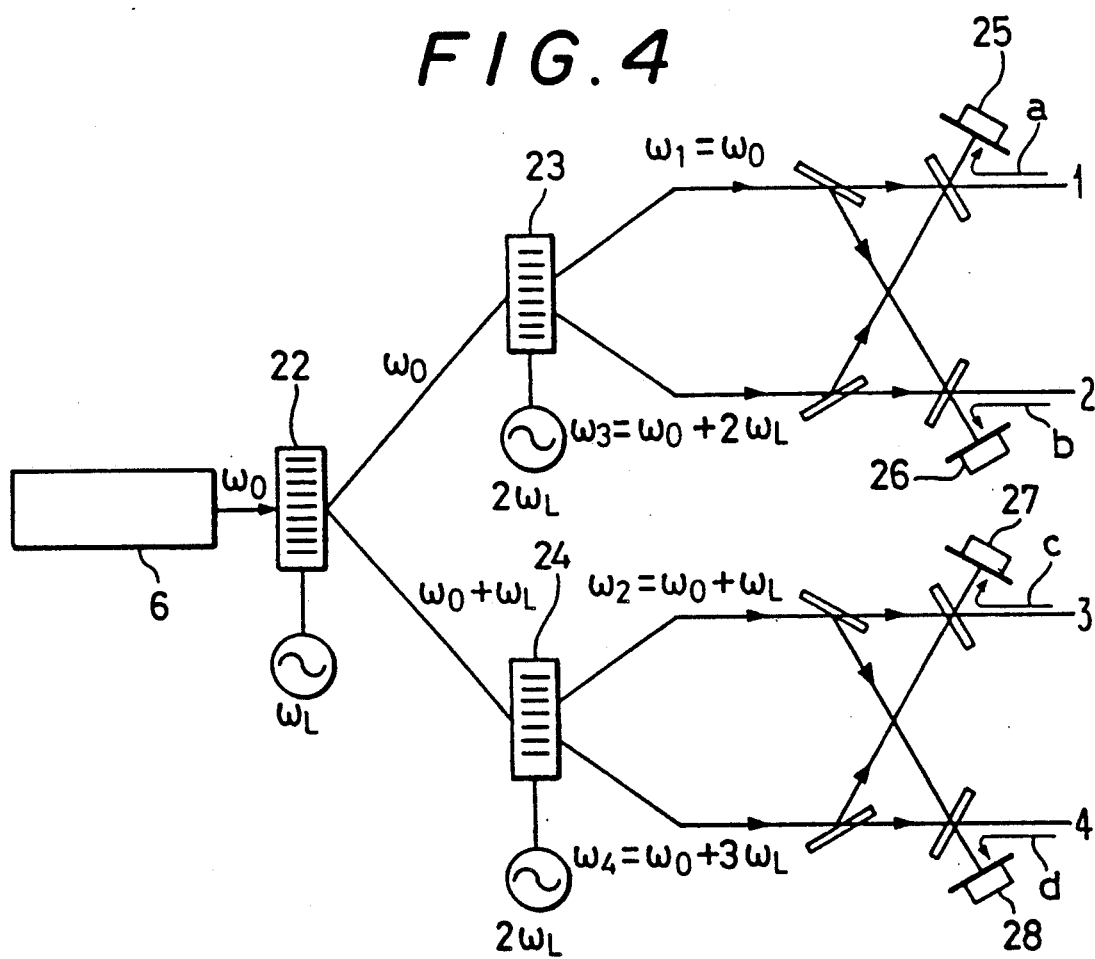
FIG. 4 is a view showing an arrangement of an optical system in a three-dimensional velocimeter according to the present invention.

FIG. 4 shows an arrangement of three-dimensional measurement.

Basically, the above-mentioned two two-dimensional velocimeters are combined so as to be perpendicular to each other in this arrangement. However, unlike in two-dimensional measurement, a total of three ultrasonic light deflectors 22, 23 and 24 having two types of drive frequencies are used in this arrangement.

Figure 5:
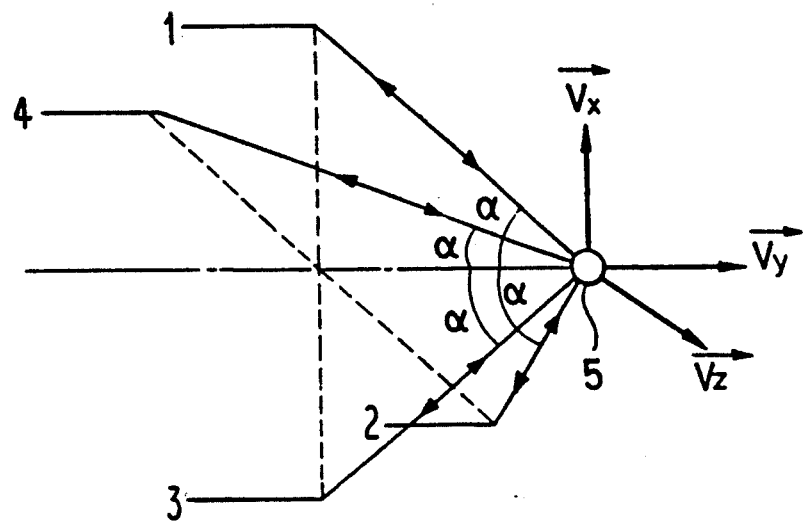
FIG. 5 is a view showing an arrangement of probes in the three-dimensional velocimeter shown in FIG. 4.

The ultrasonic light deflectors 23 and 24 are driven at an angular frequency $2\omega_L$ twice the angular frequency $\omega_L$ for driving the ultrasonic light deflector 22. Four beams are emitted from probes 1, 2, 3 and 4, respectively. The optical frequencies $\omega_1$, $\omega_2$, $\omega_3$ and $\omega_4$ of the four beams have differences $\omega_L$ therebetween, in the order named. These beams are emitted from directions along the oblique sides of a quadrangular pyramid shown in FIG. 5. Beams scattered by an object 5 to be measured which is a vertex of the pramid are caught as beams reflected by a single side respectively. The reflected beams serve as signal beams. Reference beams each having an angular frequency different from those of the signal beams by $2\omega_L$ are splitted from the beams by half mirrors.

Figure 6:
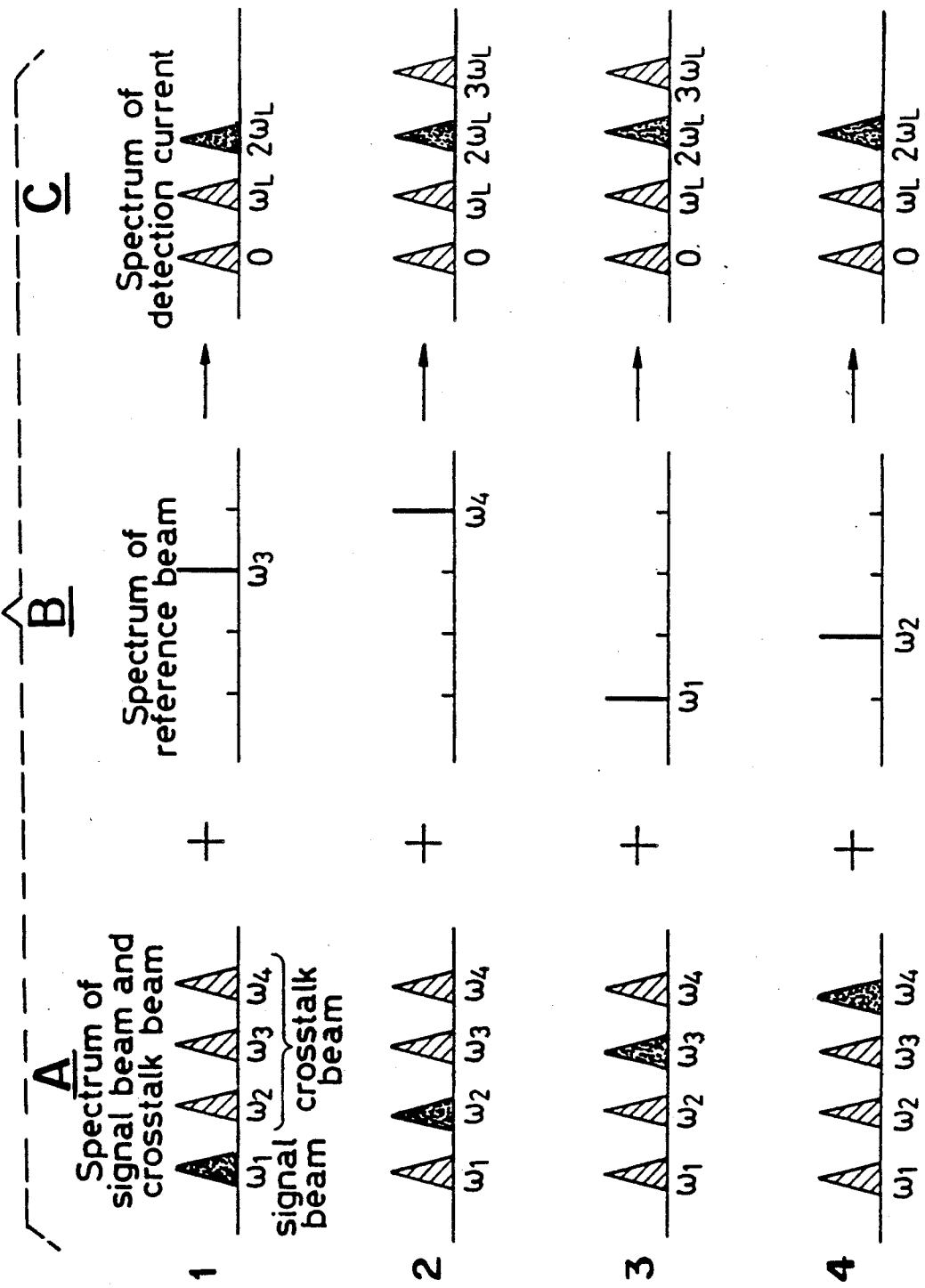
FIG. 6 is a view showing an angular frequency spectrum at each point of the probes shown in FIG. 5.

FIG. 6 shows an angular frequency component for the signal beam, the crosstalk beam and the reference beam, and the detection current. In FIG. 6, spectrum components shown with black represent components obtained from the signal beams, and spectrum components shown with hatching represent components obtained from the crosstalk beam. When each detection current passes through the bandpass filter having a center frequency $2\omega_L$, the crosstalk components can be eliminated. The detection signals from the probes 1 and 3 respectively include x- and y-direction velocity components, and the detection signals from the probes 2 and 4 respectively include y- and z-direction velocity components. As the same manner in the two-dimensional velocity measurement, the components pass through the frequency discriminators, and calculation is performed to obtain three-dimensional velocity vectors $(V_x, V_y$ and $V_z)$.

Figure 7:
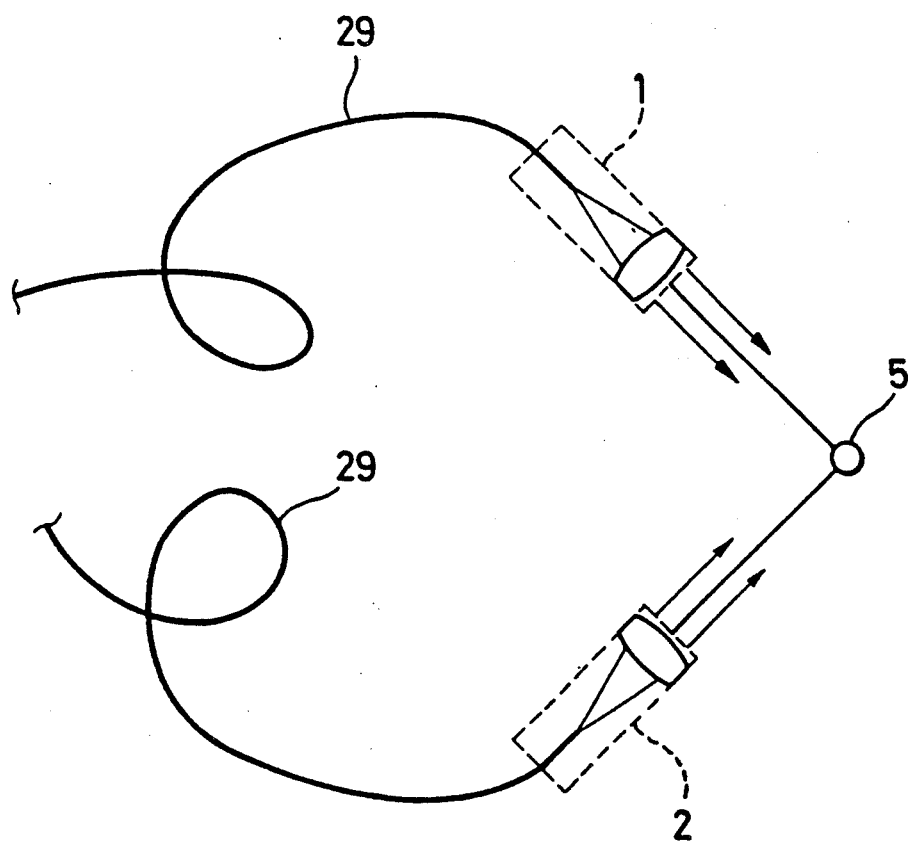
FIG. 7 is a view showing an arrangement achieved when an optical fiber is used as the end of each probe.

As shown in FIG. 7, in order to achieve small size and good operability, an optical fiber 29 can be used as a end portion of each probe to guide laser beams to the probes 1 and 2.

As described above, according to the present invention, measurement can be performed even if crosstalk occurs, so that measurement cannot be performed due to crosstalk in the conventional multi-dimensional velocimeter using a plurality of one-dimensional velocimeters. Only one laser serving as a light source is required, and the number of ultrasonic light deflectors is small. Therefore, a low-cost and small-sized multi-dimensional velocimeter can be provided.

In addition, since this velocimeter is of a reference beam type, a signal beam can be obtained in a region except a region in which probe beams intersect with each other. For this reason, the velocimeter according to the present invention has a dynamic range wider than that of the conventional two-beams differential type velocimeter which can measure only a velocity in a region in which probe beams intersect with each other. This advantage is very effective for three-dimensional vibration measurement of a solid substance.

What is claimed is:

1. A multidimensional laser Doppler velocimeter using the reference beam method for emitting not less than two probe beams to an object to be measured at a predetermined angle to multi-dimensionally measure a velocity or displacement vector of the object due to Doppler shift of beams reflected by the object, comprising:

laser beam source for generating a laser beam having a single frequency, frequency shifting means for dividing said laser beam into a plurality of beams, and for shifting the frequency of said laser beam by a predetermined frequency difference, one of the beams having the same frequency as that of said laser beam and the other each having different frequencies, beam splitting means for splitting each of the beams into a probe beam and a reference beam, the probe beam being used together with the reference beam whose frequency is different from that of the probe beam, photodetecting means on which a light beam is incident to obtain a detection current, and a bandpass filter means through which said detection current passes for eliminating a crosstalk component from said detection current, wherein the probe beam is radiated to the object to produce a scattered beam from the object, the scattered beam being directed to the photodetecting means, and the reference beam is directed through the beam splitting means to the photodetecting means thereby mixed with the scattered beam.

2. A velocimeter in accordance with claim 1, wherein an ultrasonic light deflector is used as said frequency shifting means.

3. A velocimeter in accordance with claim 2, wherein the drive frequency for said ultrasonic light deflector corresponds to the predetermined frequency difference.

4. A velocimeter in accordance with claim 3, wherein a 0th-order diffraction beam, the optical frequency of which is not shifted, and a 1st-order diffraction beam, the optical frequency of which is shifted by the drive frequency, is obtained by said ultrasonic light deflector, whereby each one of the beams is used as a reference beam when the order is used as the probe beam.

5. A velocimeter in accordance with claim 1, wherein the predetermined frequency difference of each of said beams is larger than two times the Doppler frequency shift in frequency of the scattered beam.

6. A velocimeter in accordance with claim 1, wherein the scattered beam subjected to Doppler shift returns along a path along which the probe beam is radiated to said object, the scattered beam is incident on said photodetecting means as a signal beam, and the reference beam is incident on said photodetecting means.

7. A velocimeter in accordance with claim 6, wherein a light intensity of the reference beam is larger than that of the signal beam.

8. A velocimeter in accordance with claim 1, wherein the predetermined frequency difference in frequency of each beam shifted by said frequency shifting means corresponds to a frequency band of said bandpass filter means.

9. A velocimeter for three dimensional measurement in accordance with claim 3, wherein one of four beams in which optical frequencies are shifted by $\omega_L$ respectively, is used as a probe beam, and the other of the four beams are used as reference beams having the frequency shifted from the frequency of each probe beam by $2\omega_L$.

10. A velocimeter in accordance with claim 9, comprising first to third ultrasonic light deflectors, wherein 0th- and 1st-order diffraction beams, radiated from said first ultrasonic light deflector which receives a laser beam from said single light source, and is driven at a frequency of $\omega_L$, and respectively incident on said second and third ultrasonic light deflectors driven at a frequency of $2\omega_L$, and 0th- and 1st-order diffraction beams are respectively output from said second and third ultrasonic light deflectors to obtain the four probe beams and the reference beams, and the frequency $2\omega_L$ corresponds to the frequency band of said bandpass filter means.

* * * * *

UNITED STATES PATENT AND TRADEMARK OFFICE
CERTIFICATE OF CORRECTION

PATENT NO. : 4,990,791

DATED : February 5, 1991

INVENTOR(S) : Hisami Nishi

It is certified that error appears in the above-identified patent and that said Letters Patent is hereby corrected as shown below:

Col. 1, line 48, delete +a and insert therefore $\pm a$;
Col. 1, line 65, equation (4) should read:

$$"\Delta\omega_{251} = (\omega_2 - \omega_1) - \Delta\omega_y"$$

Col. 1, line 67, insert the word "two" after the word "When" and before the word "independent"

Col. 3, line 54, the equation should read:

$$"\omega_L >> \Delta\omega_x"$$

Signed and Sealed this

Twenty-third Day of June, 1992

*Attest:*

DOUGLAS B. COMER

*Attesting Officer*     *Acting Commissioner of Patents and Trademarks*